US012732452B2

(12) United States Patent
Tran

(10) Patent No.: US 12,732,452 B2
(45) Date of Patent: Sep. 8, 2026

(54) LAYER 3 ROUTER AND METHOD FOR ROUTING PRP FRAMES

(71) Applicant: Siemens Canada Limited, Oakville (CA)

(72) Inventor: Kien Tran, Calgary (CA)

(73) Assignee: Siemens Canada Limited, Ontario (CA)

( * ) Notice: Subject to any disclaimer, the term of this patent is extended or adjusted under 35 U.S.C. 154(b) by 78 days.

(21) Appl. No.: 18/737,023

(22) Filed: Jun. 7, 2024

(65) Prior Publication Data

US 2025/0379812 A1 Dec. 11, 2025

(51) Int. Cl.

| | |
|---|---|
| ***G06F 15/16*** | (2006.01) |
| ***H04L 45/00*** | (2022.01) |
| ***H04L 45/24*** | (2022.01) |
| ***H04L 45/74*** | (2022.01) |

(52) U.S. Cl.
CPC .............. *H04L 45/24* (2013.01); *H04L 45/66* (2013.01); *H04L 45/74* (2013.01)

(58) Field of Classification Search
CPC .......... H04L 45/24; H04L 45/66; H04L 45/74
See application file for complete search history.

(56) References Cited

U.S. PATENT DOCUMENTS

| | | | | |
|---|---|---|---|---|
| 11,303,568 | B1 * | 4/2022 | Haridas | H04L 45/745 |
| 2017/0195260 | A1 * | 7/2017 | Ma | H04L 45/7453 |
| 2023/0066212 | A1 * | 3/2023 | Mullis | H04L 63/20 |

OTHER PUBLICATIONS

Rentschler M. et al., “The Parallel Redundancy Protocol for industrial IP networks,” 2013 IEEE International Conference on Industrial Technology (ICIT), pp. 1404-1409, Feb. 25-28, 2013 (Feb. 25, 2013) [retrieved on Jun. 10, 2026 (Oct. 6, 2026) from: https://ieeexplore.ieee.org/stamp/stamp.jsp?tp=&arnumber=6505877].

* cited by examiner

*Primary Examiner* — Normin Abedin

(57) ABSTRACT

There is described a Layer 3 router and method for routing PRP frames. A first frame is received at one or more ports of the Layer 3 router. A PRP suffix of the first frame, a source MAC address of the first frame, and a Redundancy Control Trailer of the first frame are identified. The first frame is forwarded to a routing subsystem of the Layer 3 router, and a second frame including a source IP address is received from the routing subsystem. The source MAC address of the first frame is assigned to the second frame in response to associating the source IP address with the source MAC address, and the Redundancy Control Trailer is appended to the second frame. The second frame is transmitted from the port or ports of the Layer 3 router.

20 Claims, 4 Drawing Sheets

LAYER 3 ROUTER AND METHOD FOR ROUTING PRP FRAMES

FIELD OF THE INVENTION

This application relates to the field of packet-switched networks and, more particularly, to routers for routing PRP frames.

BACKGROUND

Network switches may be used to manage data packets traversing over communication networks. The network switch follows a standard set of communication protocols defined and maintained by a standards organization, such as the International Electrotechnical Commission of Geneva, Switzerland. One such communication protocol standard is the Parallel Redundancy Protocol ("PRP"), which implements redundancy functions to minimize communication failures of network components. Duplicates of a data packet are transmitted simultaneously over parallel, separate redundancy networks. After a first data packet is received by the recipient, the subsequent data packet is discarded.

Types of network switches include layer 2 switches and Layer 3 switches. A layer 2 switch operates at layer 2 of the OSI model, which is the data link layer dealing with MAC addresses. The layer 2 switch includes a switch table that correlates MAC addresses of the connected devices with ports coupled to the connected devices. An incoming data packet identifies the MAC address of the destination device, and the switch identifies the port coupled to the destination device based on the MAC address. A Layer 3 switch, also known as a multilayer switch, operates at Layer 3 of the OSI model, which is the network layer dealing with IP addresses. The Layer 3 switch may operate at Layer 3 to route data using IP addresses and layer 2 to forward data using MAC addresses.

A router only operates at Layer 3 to route data using IP addresses and does not operate at layer 2 to forward data using MAC addresses. Routers may be preferable over Layer 3 switches for certain requirements, such as a connection between networks and the advanced features and performance desired for such network connections.

PRP Frames cannot be routed because they only operate in a layer 2 network per the IEC Standard (IEC-62439-3: Parallel Redundancy Protocol (PRP) and High-availability Seamless Redundancy (HSR)). When a PRP frame arrives at a Layer 3 network router, the PRP trailer is removed from the original ethernet frame. When the IP Payload is to be routed, a new ethernet frame is created and the Source MAC Address of the router is used in the Ethernet Header. This in effect removes the original Source Mac Address of the originating host device. By the time the routed packet egresses a router, all relevant PRP information has been removed (Original Source MAC Address and the PRP Trailer).

SUMMARY

In accordance with one embodiment of the disclosure, there is provided a PRP frame routing approach for a Layer 3 router.

One aspect is a Layer 3 router for routing PRP frames comprising a routing subsystem, at least one port, and a PRP module. The port or ports receive a first frame at the Layer 3 router and transmit a second frame from the Layer 3 router. The PRP module identifies a PRP suffix of the first frame, a source MAC address of the first frame, and a Redundancy Control Trailer of the first frame. The PRP module also forwards the first frame to the routing subsystem and receives a second frame including a source IP address from the routing subsystem. The PRP modules assigns the source MAC address of the first frame to the second frame in response to associating the source IP address with the source MAC address, and the PRP module appends the Redundancy Control Trailer to the second frame.

Another aspect is a method of a Layer 3 router for routing PRP frames. A first frame is received at one or more ports of the Layer 3 router. A PRP suffix of the first frame, a source MAC address of the first frame, and a Redundancy Control Trailer of the first frame are identified. The first frame is forwarded to a routing subsystem of the Layer 3 router, and a second frame including a source IP address is received from the routing subsystem. The source MAC address of the first frame is assigned to the second frame in response to associating the source IP address with the source MAC address, and the Redundancy Control Trailer is appended to the second frame. The second frame is transmitted from the port or ports of the Layer 3 router.

Yet another aspect is a non-transitory computer readable medium including executable instructions which, when executed, causes at least one processor to route PRP frames for a Layer 3 router by the above method.

The above described features and advantages, as well as others, will become more readily apparent to those of ordinary skill in the art by reference to the following detailed description and accompanying drawings. While it would be desirable to provide one or more of these or other advantageous features, the teachings disclosed herein extend to those embodiments which fall within the scope of the appended claims, regardless of whether they accomplish one or more of the above-mentioned advantages.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects.

DETAILED DESCRIPTION

Figure 1:
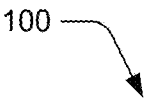
FIG. 1 is an illustration of an example packet-switched network for routing PRP frames.
Figure 1:
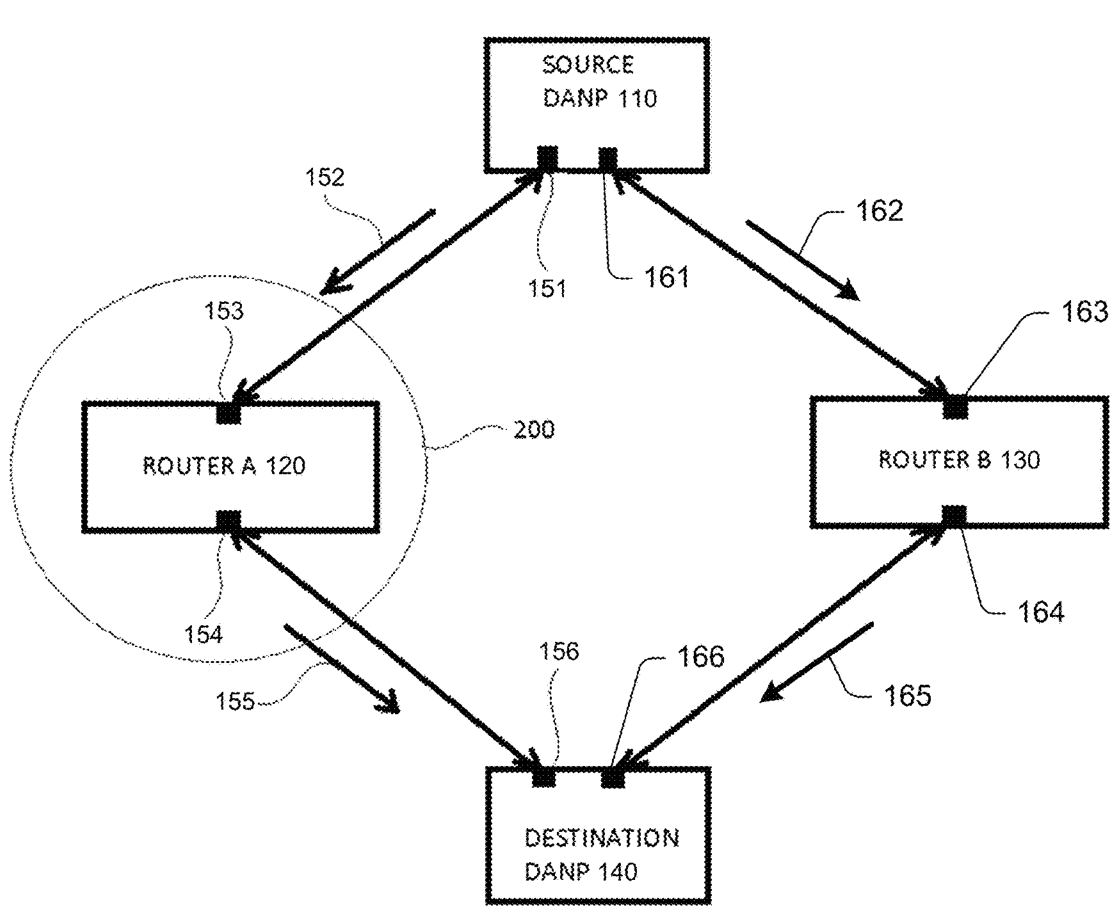

Various technologies that pertain to systems and methods that facilitate routing of PRP frames at a Level 3 router of a packet-switched network will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

Referring to FIG. 1, there is shown an example packet-switched network 100 for routing PRP frames. The network 100 includes a source node 110, intermediate routers 120, 130, and a destination node 140. For example, each of the source node 110 and the destination node 140 may be a double attached node for PRP ("DANP"). The source node 110 transmits a first frame A 152 from a first source port 151 of the source node 110 to a first router port A 153 of the router A 120. The source node 110 transmits a duplicate frame, i.e., first frame B 162 from a second source port 161 of the source node 110 to a first router port B 163 of the router B 130.

In contrast to switches capable of operating at Level 2, the Level 3 routers A and B 120, 130 route the payloads of the first frames 152, 162 received at the first router ports 153, 163 to second frames 155, 165 transmitted from the second router ports 154, 164 to a subsequent device, such as destination node 140. When routing the payloads of the first frames 152, 162, the Level 3 routers 120, 130 create a new frame (i.e., second frame) that includes the source address of the corresponding router. For example, the Level 3 router A 120 may create a second frame A 155 based on the first frame A 152 in which the second frame A include the payload of first frame A but replaces the original source MAC address of the originating host device in the header with a source MAC address of the router A 120. This, in effect, removes the original Source Mac Address of the originating host device. A similar process of creating a second frame B 165 based on the first frame B 162 occurs at the router B 130. By the time the routed packet egresses each router 120, 130, all relevant PRP information has been removed, including the original source MAC address and the PRP Trailer.

The destination node 140 includes at a first destination port 156 that receives the second frame A 155 from a second router port 154 of the router A 120. Likewise, the destination node 140 includes a second destination port 166 that may receive a similar frame, i.e., the second frame B 165 based on the duplicate frame 162, from a second router port 164 of the router B 130.

Figure 2:
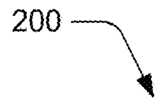
FIG. 2 represents a Layer 3 router of FIG. 1 in an example implementation that is operable to employ techniques described herein
Figure 2:
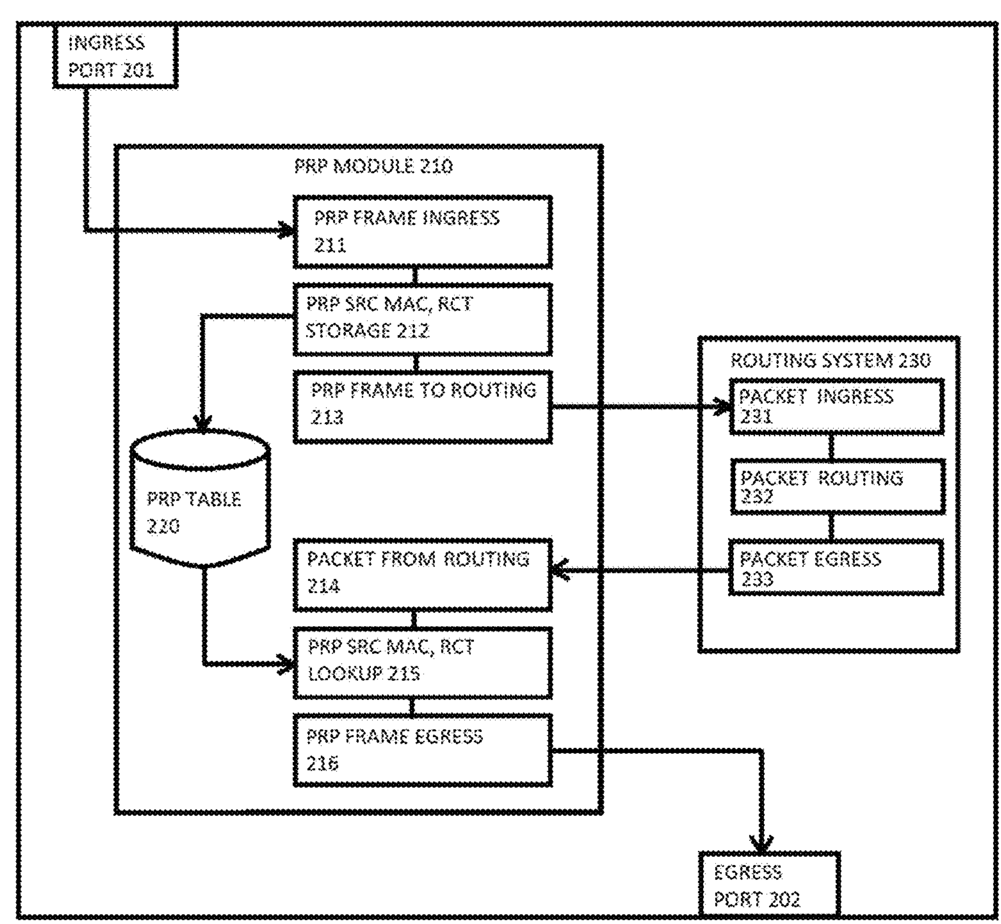

Referring to FIG. 2, there is shown a Layer 3 router 200 in an example implementation that is operable to employ techniques described herein. The Layer 3 router 200 is a representation of the router A 120 and the router B 130 of FIG. 1. The router 200 include a first port 201 (similar to the first router ports 153, 163), a second port 202 (similar to second router ports 154, 164), a PRP module 210, a PRP storage component 220, and a routing subsystem 230. The PRP module 210 and the routing subsystem 230 may be executing by one or processors of the router 200. The PRP storage component 220 may be separate from, or included in, the PRP module 210 and/or routing system 230.

The first port 201 of the router 200 receives frames and provides them to a PRP frame ingress submodule 211 of the PRP module 210 before the routing subsystem 230 has a chance to route the incoming frame. When a first frame (i.e., PRP frame) enters the PRP frame ingress submodule 211 of the router 200, this "PRP aware" router captures the first frame and recognizes that it is a PRP frame by its PRP trailer. For some embodiment, the PRP frame ingress submodule 211 of the router may recognize the PRP frame based on whether the PRP trailer includes a PRP suffix, such as "0x88FB". For some embodiments, the PRP frame ingress submodule 211 may recognize the PRP frame based on a size field in the trailer matching the size of a PRP frame.

In response to recognizing that the first frame is PRP frame, a PRP storage submodule 212 of the PRP module 210 identifies the source address of the first frame and stores it in the memory component 220 so that the source address is correlated with a source IP address. For example, the PRP storage submodule 212 may extract a source MAC address from the first frame and store it in a lookup table of the memory component 220 keyed by the source IP address.

The first frame will then transfer from the frame-to-routing submodule 213 of the PRP module 210 to a packet ingress submodule of the routing subsystem 230 and traverse the routing subsystem 220, such as a Linux kernel, in its original format (i.e., no modifications). In particular, the first frame is received by the packet ingress submodule 231, is routed by a packet routing submodule 232, and leaves a packet egress submodule 233 as a second frame. For some embodiments having a Linux kernel operating on Ethernet frames using Socket Buffers (SKBs), the PRP trailer is present in the original Socket Buffer (SKB) and may be accessed at any point in the Ethernet or IP packet path. Thus, subsequent to a routing decision being made in the packet routing submodule 232, the original IP Payload is sent to the appropriate port by the packet egress submodule 232 to be egressed. Prior to transmission by the routing subsystem 230, a new frame, i.e., the second frame, is created by the packet routing submodule 232. The packet routing submodule 232 uses its own device MAC address as the source MAC address for the egressing second frame.

For some embodiments, a packet-from-routing submodule 214 of the PRP module 210 intercepts the second frame received from the routing subsystem 230 and determines if the second frame is a PRP frame. For example, the packet-from-routing submodule 214 may determine whether the associated SKB includes a PRP trailer, such as PRP suffix 0x88FB. If a PRP trailer is detected, then a lookup submodule 215 performs a source address lookup of the memory component 220, such as the lookup table therein. The lookup submodule 215 uses the source IP address of the second frame. The lookup submodule 215 replaces the source address of the second frame, such as the source MAC Address, with the source address identified by the lookup performed. The lookup submodule 215 also appends the original PRP trailer contents that has been preserved in the memory component 220, such as the original Socket Buffer (SKB). The lookup submodule 215 may also adjust the frame size of the second frame to include the appended PRP trailer.

Subsequent to modifying the second frame by the lookup submodule 215, a PRP frame egress submodule 216 transfers the second frame as modified to the egress port 202 of the router 200. In this manner, the second frame egressed from the router's egress port 202 is a valid PRP frame including the source address of the original source host, the original IP payload, and the original PRP trailer. Accordingly, the second frame is egressed from the router 200 with all relevant PRP information preserved.

Figure 3:
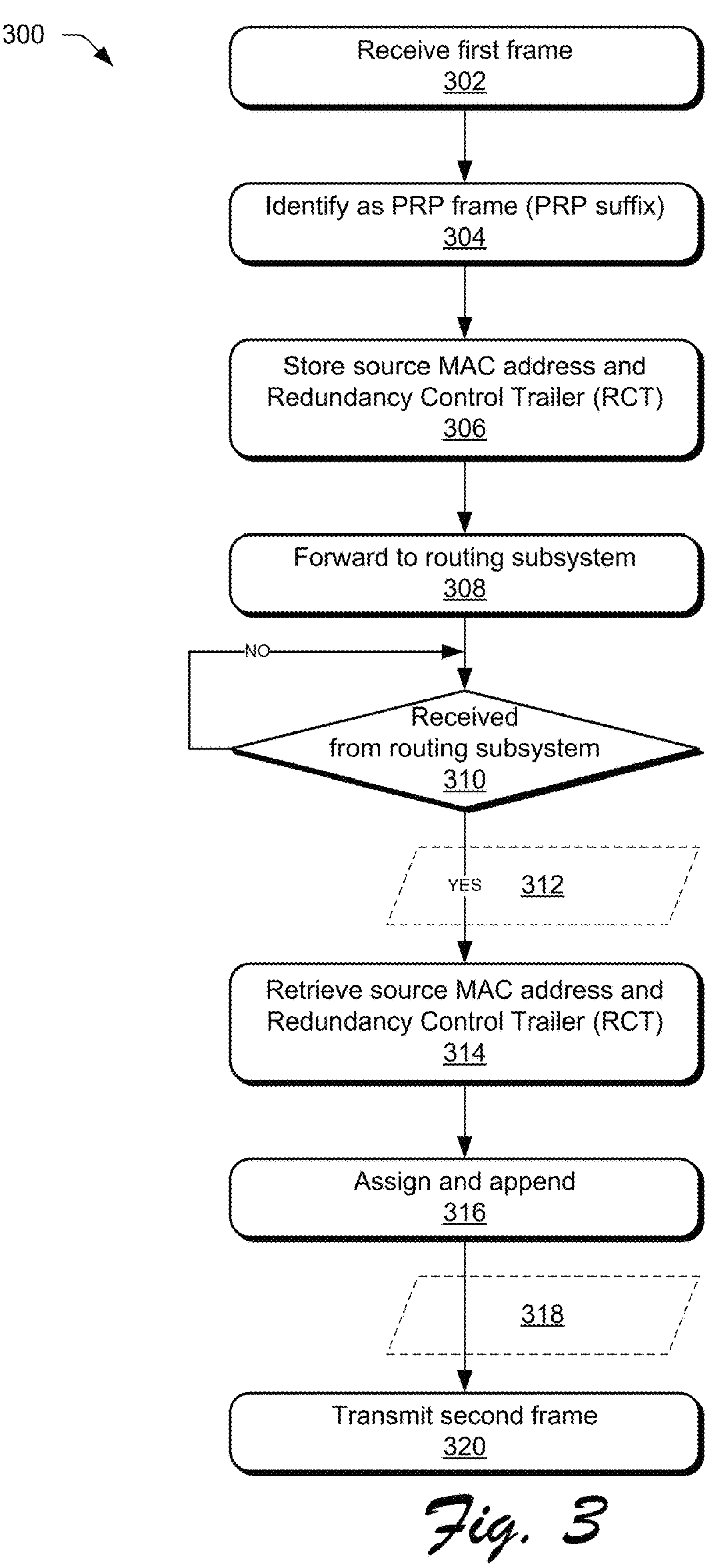
FIG. 3 is a flow diagram of an operation of the Layer 3 router of FIG. 1 in an example implementation that is operable to employ the techniques described herein.

Referring to FIG. 3, there is shown an operation 300 of the Layer 3 router for routing PRP frames in an example implementation that is operable to employ the techniques described herein. A first frame is received (302) at one or more ports of the Layer 3 router. In response to receiving (302) the first frame, a PRP suffix of the first frame is identified (304). For some embodiments, the PRP suffix identifies a PRP frame by including a specific PRP indicator, such as "0x88FB". Also, in response to receiving (302) the first frame, a source MAC address of the first frame and a Redundancy Control Trailer ("RCT") of the first frame are identified (304). In response to identifying (304) the PRP suffix, the source MAC address, and/or the Redundancy Control Trailer, the source MAC address of the first frame and the Redundancy Control Trailer of the first frame are stored (306) at the memory component of the router.

The first frame is forwarded (308) to a routing subsystem of the Layer 3 router in response to storing (306) the source MAC address and the Redundancy Control Trailer of the first frame at the memory component. The router then waits (310) for the routing subsystem to send a second frame associated with the first frame back to the Layer 3 router. While at the routing subsystem, the second frame is generated from the first frame by omitting the source MAC address and the Redundancy Control Trailer of the first frame from the second frame.

At the time when the second frame is received (310) from the routing subsystem, the second frame (312) includes a source IP address but does not include the source MAC address of the first frame or the Redundancy Control Trailer of the first frame. For some embodiments, the second frame received from the routing subsystem 230 is intercepted and checked whether the second frame is a PRP frame. For example, the router may determine whether the associated SKB includes a PRP trailer, such as PRP suffix 0x88FB.

The router retrieves (314) from the memory component the source MAC address of the first frame and the Redundancy Control Trailer of the first frame in response to receiving (310) the second frame from the routing subsystem. In response to retrieving the source MAC address and the Redundancy Control Trailer, the router associates (316) the source IP address with the source MAC address. In addition, the router assigns (316) the source MAC address of the first frame to the second frame in response to associating the source IP address with the source MAC address. The router further appends (316) the Redundancy Control Trailer to the second frame. The second frame (318) includes the source MAC address of the first frame after assigning the source MAC address of the first frame to the second frame. Thus, the second frame (312) from does not include the source MAC address or the Redundancy Control Trailer before modifying (316) the second frame but does include them after modifying the second frame. Thereafter, the second frame is transmitted (320) from the one or more ports of the Layer 3 router to another node of the packet-switched network.

Figure 4:
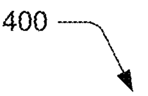
FIG. 4 is a format diagram of an example PRP frame that be received and/or transmitted by the Layer 3 router.
Figure 4:
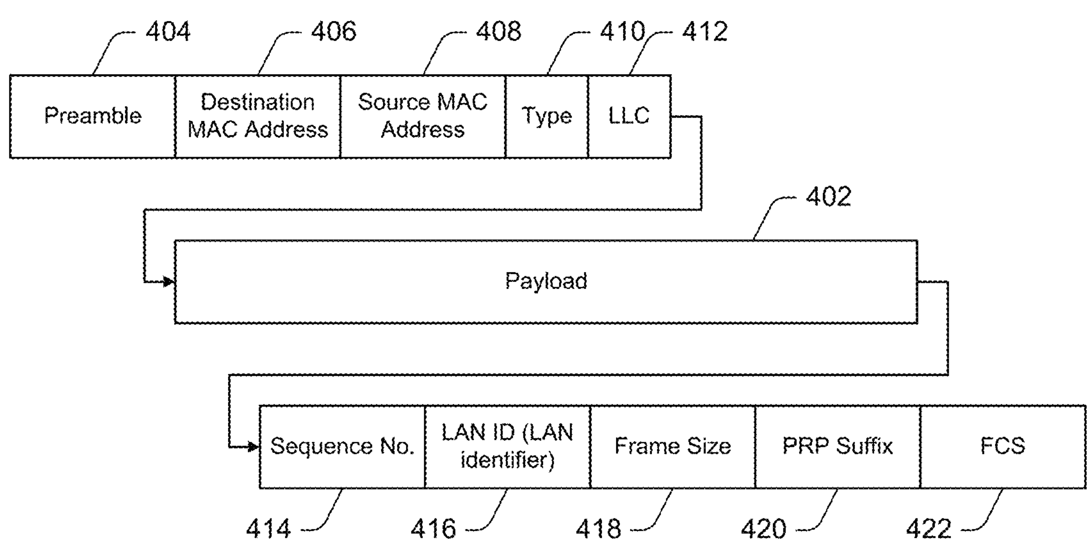

Referring to FIG. 4, there is shown an example PRP frame 400 that be received and/or transmitted by the Layer 3 router. The PRP frame 400 includes a payload 402, pre-payload data 404-412, and post-payload data 414-422. The pre-payload data includes a source address 408, such as a MAC address. The post-payload data includes a trailer 414-420, such as a Redundancy Control Trailer ("RCT"). The Redundancy Control Trailer includes a sequence number 414, a LAN identifier 416, a frame size 418, and a PRP suffix 420. The PRP frame 400 is identified by PRP nodes by the following: the source address 408, the PRP trailer (RCT) 414-420, which includes the sequence number 414, the LAN ID 416, and the PRP Suffix 420.

For some embodiments, the PRP frame 400 may include other information. For example, the pre-payload data may include a preamble 404, a destination address 406, a frame type 410, and/or a logical link control ("LLC") 412. As another example, the post-payload data may include a frame check sequence ("FCS") 422.

Those skilled in the art will recognize that, for simplicity and clarity, the full structure and operation of all data processing systems suitable for use with the present disclosure are not being depicted or described herein. Also, none of the various features or processes described herein should be considered essential to any or all embodiments, except as described herein. Various features may be omitted or duplicated in various embodiments. Various processes described may be omitted, repeated, performed sequentially, concurrently, or in a different order. Various features and processes described herein can be combined in still other embodiments as may be described in the claims.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an example embodiment of the present disclosure has been described in detail, those skilled in the art will understand that various changes, substitutions, variations, and improvements disclosed herein may be made without departing from the spirit and scope of the disclosure in its broadest form.

What is claimed is:

1. A Layer 3 router for routing PRP frames comprising:
a routing subsystem;
at least one port configured to receive a first frame at the Layer 3 router and transmit a second frame from the Layer 3 router; and
a PRP module configured to identify a PRP suffix of the first frame, a source MAC address of the first frame, and a Redundancy Control Trailer of the first frame, forward the first frame to the routing subsystem, receive a second frame including a source IP address from the routing subsystem, assign the source MAC address of the first frame to the second frame in response to associating the source IP address with the source MAC address, and append the Redundancy Control Trailer to the second frame.

2. The Layer 3 router as described in claim 1, wherein the PRP suffix includes 0x88FB.

3. The Layer 3 router as described in claim 1, further comprising a memory component configured to store the source MAC address of the first frame and the Redundancy Control Trailer of the first frame in response to identifying the PRP suffix of the first frame, wherein the PRP module retrieves from the memory component the source MAC address of the first frame and the Redundancy Control Trailer of the first frame in response to receiving the second frame from the routing subsystem.

4. The Layer 3 router as described in claim 1, wherein the second frame includes the source MAC address of the first frame after assigning the source MAC address of the first frame to the second frame.

5. The Layer 3 router as described in claim 1, wherein the second frame does not include the source MAC address of the first frame before after assigning the source MAC address of the first frame to the second frame.

6. The Layer 3 router as described in claim 1, wherein the second frame from does not include the Redundancy Control Trailer of the first frame before appending the Redundancy Control Trailer to the second frame.

7. The Layer 3 router as described in claim 1, wherein the routing subsystem generates the second frame from the first frame by omitting the source MAC address and the Redundancy Control Trailer of the first frame from the second frame.

8. A method of a Layer 3 router for routing PRP frames, the method comprising:

receiving a first frame at one or more ports of the Layer 3 router;

identifying a PRP suffix of the first frame, a source MAC address of the first frame, and a Redundancy Control Trailer of the first frame;

forwarding the first frame to a routing subsystem of the Layer 3 router;

receiving, from the routing subsystem, a second frame including a source IP address;

assigning the source MAC address of the first frame to the second frame in response to associating the source IP address with the source MAC address and appending the Redundancy Control Trailer to the second frame; and transmitting the second frame from the one or more ports of the Layer 3 router.

9. The method as described in claim 8, wherein the PRP suffix includes 0x88FB.

10. The method as described in claim 8, further comprising:

storing, at the memory component, the source MAC address of the first frame and the Redundancy Control Trailer of the first frame in response to identifying the PRP suffix of the first frame; and retrieving, from the memory component, the source MAC address of the first frame and the Redundancy Control Trailer of the first frame in response to receiving the second frame from the routing subsystem.

11. The method as described in claim 8, wherein the second frame includes the source MAC address of the first frame after assigning the source MAC address of the first frame to the second frame.

12. The method as described in claim 8, wherein the second frame does not include the source MAC address of the first frame before after assigning the source MAC address of the first frame to the second frame.

13. The method as described in claim 8, wherein the second frame does not include the Redundancy Control Trailer of the first frame before appending the Redundancy Control Trailer to the second frame.

14. The method as described in claim 8, wherein the routing subsystem generates the second frame from the first frame by omitting the source MAC address and the Redundancy Control Trailer of the first frame from the second frame.

15. A non-transitory computer readable medium including executable instructions which, when executed, causes at least one processor to route PRP frames for a Layer 3 router by:

receiving a first frame at one or more ports of the Layer 3 router;

identifying a PRP suffix of the first frame, a source MAC address of the first frame, and a Redundancy Control Trailer of the first frame;

forwarding the first frame to a routing subsystem of the Layer 3 router;

receiving, from the routing subsystem, a second frame including a source IP address;

assigning the source MAC address of the first frame to the second frame in response to associating the source IP address with the source MAC address and appending the Redundancy Control Trailer to the second frame; and transmitting the second frame from the one or more ports of the Layer 3 router.

16. The non-transitory computer readable medium as described in claim 15, wherein the PRP suffix includes 0x88FB.

17. The non-transitory computer readable medium as described in claim 15, further comprising:

storing, at the memory component, the source MAC address of the first frame and the Redundancy Control Trailer of the first frame in response to identifying the PRP suffix of the first frame; and retrieving, from the memory component, the source MAC address of the first frame and the Redundancy Control Trailer of the first frame in response to receiving the second frame from the routing subsystem.

18. The non-transitory computer readable medium as described in claim 15, wherein the second frame includes the source MAC address of the first frame after assigning the source MAC address of the first frame to the second frame.

19. The non-transitory computer readable medium as described in claim 15, wherein the second frame does not include the source MAC address of the first frame before after assigning the source MAC address of the first frame to the second frame.

20. The non-transitory computer readable medium as described in claim 15, wherein the second frame from does not include the Redundancy Control Trailer of the first frame before appending the Redundancy Control Trailer to the second frame.

* * * * *